(12) United States Patent
Gou et al.

(10) Patent No.: US 9,166,808 B2
(45) Date of Patent: Oct. 20, 2015

(54) METHOD FOR SWITCHOVER BETWEEN MBMS TRANSMISSION MODES, APPARATUS, AND USER EQUIPMENT

(75) Inventors: Wei Gou, Shenzhen (CN); Zijiang Ma, Shenzhen (CN); Hui Xu, Shenzhen (CN); Bin Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 164 days.

(21) Appl. No.: 14/005,867

(22) PCT Filed: Feb. 15, 2012

(86) PCT No.: PCT/CN2012/071153
§ 371 (c)(1),
(2), (4) Date: Oct. 21, 2013

(87) PCT Pub. No.: WO2012/126296
PCT Pub. Date: Sep. 27, 2012

(65) Prior Publication Data
US 2014/0301267 A1    Oct. 9, 2014

(30) Foreign Application Priority Data

Mar. 21, 2011    (CN) .......................... 2011 1 0068051

(51) Int. Cl.
*H04W 4/06*        (2009.01)
*H04L 12/18*       (2006.01)
(Continued)

(52) U.S. Cl.
CPC .......... *H04L 12/189* (2013.01); *H04L 65/4076* (2013.01); *H04W 4/06* (2013.01);
(Continued)

(58) Field of Classification Search
CPC . H04L 12/189; H04L 65/4076; H04L 63/104; H04L 63/30; H04L 63/107; H04L 61/2069; H04W 48/08; H04W 72/005; H04W 88/06; H04W 76/002; H04W 48/16; H04W 4/06; H04W 72/00; H04W 12/08; H04W 8/186; H04W 72/0406; H04W 36/0011; H04W 4/08

USPC ................. 370/312, 328, 329, 331, 349, 390; 455/436–446, 422.1
See application file for complete search history.

(56) References Cited

U.S. PATENT DOCUMENTS 6,973,081 B1 *  12/2005  Patel ............................. 370/390
8,000,292 B2 *   8/2011  Cai et al. ...................... 370/329
(Continued)

FOREIGN PATENT DOCUMENTS

CN          101136814 A      3/2008
CN          101141397 A      3/2008
(Continued)

OTHER PUBLICATIONS

"Enhancements for FDD HSPA Evolution"; 3rd Generation Partnership Project; Technical Specification Group Radio Access Network; 3GPP TR R3.022 V0.6.0; Nov. 2008; Release 8; see pp. 2-34/E.
(Continued)

*Primary Examiner* — Edan Orgad
*Assistant Examiner* — Ivan O Latorre
(74) *Attorney, Agent, or Firm* — Ling Wu; Stephen Yang; Ling and Yang Intellectual Property (57) ABSTRACT

The present document provides a switchover method and apparatus for multimedia broadcast multicast service (MBMS) transmission modes; the method includes the following steps: a network side notifying a user equipment (UE) that one or more MBMSs will be transmitted by means of a point to multipoint (PTM) mode, then transmitting relevant information of the one or more MBMSs to the UE. The present document ensures the continuity of the MBMSs which are being received by the UE during the switching process from a PTP mode to the PTM mode, and is easy to implement and operate.

19 Claims, 4 Drawing Sheets

(51) Int. Cl.
*H04L 29/06* (2006.01)
*H04W 48/08* (2009.01)
*H04W 72/00* (2009.01)
*H04L 29/12* (2006.01)
*H04W 76/00* (2009.01)
*H04W 88/06* (2009.01)

(52) U.S. Cl.
CPC ........... *H04W 48/08* (2013.01); *H04W 72/005* (2013.01); *H04L 61/2069* (2013.01); *H04W 76/002* (2013.01); *H04W 88/06* (2013.01)

(56) References Cited

U.S. PATENT DOCUMENTS

| | | | |
|---|---|---|---|
| 2004/0131026 A1* | 7/2004 | Kim et al. | 370/328 |
| 2004/0156332 A1* | 8/2004 | Terry et al. | 370/328 |
| 2005/0118992 A1* | 6/2005 | Jeong et al. | 455/422.1 |
| 2006/0106865 A1* | 5/2006 | Beming et al. | 707/104.1 |
| 2007/0070972 A1* | 3/2007 | Wang et al. | 370/349 |
| 2007/0105557 A1* | 5/2007 | Israelsson et al. | 455/436 |
| 2008/0267109 A1* | 10/2008 | Wang et al. | 370/312 |
| 2010/0128649 A1* | 5/2010 | Gonsa et al. | 370/312 |
| 2010/0315987 A1* | 12/2010 | Kuo | 370/312 |
| 2012/0155361 A1* | 6/2012 | Wei et al. | 370/312 |

FOREIGN PATENT DOCUMENTS

| | | |
|---|---|---|
| CN | 101170466 A | 4/2008 |
| EP | 1650989 A1 | 4/2006 |
| EP | 1983769 A1 | 10/2008 |
| JP | 2010525763 A | 7/2010 |
| WO | 2005022814 A1 | 3/2005 |
| WO | 2008046347 A1 | 4/2008 |
| WO | 2008128356 A1 | 10/2008 |
| WO | 2008134554 A2 | 11/2008 |

OTHER PUBLICATIONS

"Radio Resource Control (RRC)"; 3rd Generation Partnership Project; Technical Specification Group Radio Access Network; Protocol specification; 3GPP TS 25.331 V10.2.0; Dec. 2010; Release 10; see pp. 2-60/E.

"Stage 3 issue related with counting procedure"; 7.3.2, ZTE, Discussion and decision; 3GPP TSG-RAN WG2 #71 bis Oct. 11-15, 2010, Xi'an, China; R2-105354; see pp. 2-6/E.

International Search Report for PCT/CN2012/071153 dated Apr. 22, 2012.

"DISC on MBMS service activation/deactivation further to counting"; 7.3.1.2; LTE MBMS enhancements; NEC; Discussion and approval; 3GPP TSG-RAN2 Meeting #72; Jacksonville, Florida US, Nov. 15-19, 2010; R2-106488; see pp. 1-7.

* cited by examiner

METHOD FOR SWITCHOVER BETWEEN MBMS TRANSMISSION MODES, APPARATUS, AND USER EQUIPMENT

TECHNICAL FIELD

The present document is put forwarded aiming at a switchover between two different modes for transmitting multimedia broadcast multicast service (MBMS) service, and mainly relates to a switchover method, apparatus and user equipment for switching from a point to point (PTP) MBMS service transmission mode to a multimedia broadcast multicast service single frequency network (MBSFN) transmission mode taking an MBSFN area as a unit.

BACKGROUND OF THE RELATED ART

With the swift and violent development of the Internet and the popularization of the large screen multi-function mobile phone, a large number of mobile data multimedia services and various high bandwidth multimedia services, for example: video conference, television broadcasting, video on demand, video advertisement, online education, interactive game, etc. appears, which not only meet the constantly rising service requirement of the mobile subscriber but also bring the new service growth point for the mobile operator at the same time. These mobile data multimedia services require a plurality of users to be able to receive the same data at the same time, and compared with the general data service, the mobile data multimedia services have the characteristics such as, large data bulk, long duration time, sensitive time delay, etc. In order to utilize the mobile network resources effectively, the 3rd Generation Partnership Project (abbreviated as 3GPP) puts forward the MBMS service, and the service is a kind of technology that the data are transmitted to a plurality of targets from one data source, realizes the sharing of the network (including the core network and the access network) resources, improves the utilization rate of the network resources (especially the air interface resources). The MBMS service defined by the 3GPP not only can realize the message-type multicasting and broadcasting of the pure text and low speed, but also can realize the broadcasting and multicasting of the high-speed multimedia service, to provide various abundant videos, audios and multimedia services; this is undoubtedly complied with the development trend of the future mobile data, and provides the better service prospect for the $3^{rd}$ generation digital communication (3rd Generation, 3G) development.

During the MBMS standard formulation of the Long Term Evolution (LTE) R10, it is proposed by the telecommunication operator orange that the MBMS service can be transmitted for the user equipment (UE) by means of the PTP mode in the Evolved Universal Terrestrial Radio Access Network (E-UTRAN) according to the demand of the operator. And it gets supporting and approval of other companies after more than one meeting discussion of the LTE, and it is proposed that the Counting is performed for this kind of services when discussing the MBMS Counting; according to the Counting result, if the number of the users receiving certain MBMS service under the PTP mode meets the threshold requirement (that is, the number of the receiving users is great), then the MBMS service can be converted as an MBMS service transmitted by means of the MBSFN mode in a certain MBSFN area (wherein, the MBSFN mode is a kind of point to multipoint (described as PTM hereinafter) mode, and it is a multiple cell union transmission mode (certainly it can be of one cell under extreme conditions, but there is no air interface combination gain at this moment), for details, referring to the description of the Multi-cell transmission in 15.3.3 of the protocol LTE 36.300v10.1.0), which will be described with the PTM mode in the following description. After the number of the users receiving the MBMS service exceeds a certain threshold, the transmission mode is switched from the PTP mode to the PTM mode, which can further promote the efficiency of the spectrum for transmitting the MBMS service, and save the spectral resources.

There is no specific switchover method for switching from transmitting the MBMS service by means of the PTP mode to transmitting the MBMS service by means of the PTM mode in the related art.

SUMMARY OF THE INVENTION

The technical problem that the present document is required to solve is to provide a switchover method, apparatus and user equipment for the MBMS service transmission modes, and realize the switchover from the PTP mode to the PTM mode for transmitting the MBMS service.

In order to solve the above-mentioned problem, the present document provides a switchover method for multimedia broadcast multicast service (MBMS) transmission modes, comprising:

a network side notifying a user equipment that one or more MBMSs will be transmitted by means of a point to multipoint (PTM) mode, and transmitting relevant information of the one or more MBMSs to the user equipment.

The method further comprises: before the network side notifies the user equipment that one or more MBMSs will be transmitted by means of the PTM mode, determining that a PTM mode bearer of the MBMS is established successfully, or determining that the PTM mode bearer of the MBMS can be established successfully.

The network side determines that the PTM mode bearer of the MBMS can be established successfully by the following way:

determining that sufficient resources can be distributed for the MBMS transmitted by means of the PTM mode, and/or, determining that a priority rank of the MBMS is high enough.

The user equipment notified by the network side is a user equipment which is receiving the one or more MBMSs by means of a point to point (PTP) mode.

The network side carries the relevant information when notifying the user equipment.

The relevant information comprises one kind or a combination of the following information: multimedia broadcast multicast service single frequency network (MBSFN) area information of the MBMS under the PTM mode, start time information of the MBMS under the PTM mode, and a temporary mobile group identify (TMGI) corresponding to the MBMS under the PTM mode.

The method further comprises: the user equipment receiving the MBMS by means of the PTM mode according to the relevant information.

The method further comprises: before the user equipment receives the MBMS by means of the PTM mode according to the relevant information, judging whether the user equipment has MBMS ability; if the user equipment has the MBMS ability, then receiving the MBMS by means of the PTM mode according to the relevant information.

The method further comprises: when the user equipment receives the MBMS by means of the PTM mode, judging whether the MBMS received under the PTM mode and the MBMS received under the PTP mode are continuous; if not, then keeping to receive the MBMS by means of the PTM mode and the PTP mode simultaneously, until the MBMSs received under the two modes are continuous.

The method further comprises: when the MBMSs received by the user equipment under the PTM mode and the PTP mode are continuous, stopping receiving the MBMS by means of the PTP mode.

The method further comprises: when the MBMS received under the PTM mode and the MBMS received under the PTP mode by the user equipment are continuous, transmitting a request to the network side, to request the network side to stop transmitting the MBMS by means of the PTP mode.

The method further comprises: when the network side receives the request, stopping transmitting the MBMS for the user equipment by means of the PTP mode.

Only when the network side is triggered to perform the PTM mode transmission of the one or more MBMSs, the network side notifies the user equipment that the one or more MBMSs will be transmitted by means of the PTM mode.

The method further comprises: the network side counting up the number of the user equipments receiving the one or more MBMSs by means of the PTP mode and/or the number of the user equipments interested in receiving the one or more MBMSs by means of the PTM mode, and judging whether to trigger to perform the PTM mode transmission of the one or more MBMSs according to a counting result.

The network side is an Evolved Universal Terrestrial Radio Access Network (E-UTRAN).

The present document further provides a switchover apparatus for multimedia broadcast multicast service (MBMS) transmission modes, comprising:

a notification unit, configured to notify a user equipment that one or more MBMSs will be transmitted by means of a point to multipoint (PTM) mode, and transmit relevant information of the one or more MBMSs to the user equipment.

The apparatus further comprises a judgment unit, wherein, the judgment unit is configured to judge whether a PTM mode bearer of the MBMS is established successfully, or judge whether the PTM mode bearer of the MBMS can be established successfully; if yes, then indicate the notification unit to notify the user equipment that the one or more MBMSs will be transmitted by means of the PTM mode.

The judgment unit is configured to determine that the PTM mode bearer of the MBMS can be established successfully by the following way:

determining that sufficient resources can be distributed for the MBMS transmitted by means of the PTM mode, and/or, determining that a priority rank of the MBMS is high enough.

The user equipment is a user equipment which is receiving the one or more MBMSs by means of a point to point (PTP) mode.

The notification unit is configured to carry the relevant information when notifying the user equipment, to transmit the relevant information to the user equipment.

The relevant information comprises one kind or a combination of the following information: multimedia broadcast multicast service single frequency network (MBSFN) area information of the MBMS under the PTM mode, start time information of the MBMS under the PTM mode, and a temporary mobile group identify (TMGI) corresponding to the MBMS under the PTM mode.

The apparatus further comprises a transmission control unit, configured to control the network side to stop transmitting the MBMS for the user equipment by means of the PTP mode when receiving a request from the user equipment to request to stop transmitting the MBMS by means of the PTP mode.

The apparatus further comprises a triggering unit, wherein, the triggering unit is configured to trigger to perform the PTM mode transmission of the one or more MBMSs; and the notification unit is configured to notify the user equipment that the one or more MBMSs will be transmitted by means of the PTM mode only after the triggering unit triggers to perform the PTM mode transmission of the one or more MBMSs.

The apparatus further comprises a counting unit, configured to count up the number of the user equipments receiving the one or more MBMSs by means of the PTP mode and/or the number of the user equipments interested in receiving the one or more MBMSs by means of the PTM mode; and the triggering unit is configured to judge whether to trigger to perform the PTM mode transmission of the one or more MBMSs according to a counting result of the counting unit.

The present document further provides a user equipment, comprising:

a signaling receiving unit, configured to receive a notification that one or more multimedia broadcast multicast services (MBMS) will be transmitted by means of a point to multipoint (PTM) mode from a network side, and receive relevant information of the one or more MBMSs; and a data receiving unit, configured to receive the one or more MBMSs by means of the PTM mode according to the relevant information.

The user equipment further comprises an ability judgment unit, configured to: before the data receiving unit receives the MBMS by means of the PTM mode according to the relevant information, judge whether the user equipment has MBMS ability; if the user equipment has the MBMS ability, then indicate the data receiving unit to receive the MBMS.

The user equipment further comprises a continuity judgment unit, configured to: when the data receiving unit receives the MBMS by means of the PTM mode, judge whether the MBMS received under the PTM mode and the MBMS received under the PTP mode are continuous; if not, then indicate the data receiving unit to keep receiving the MBMS by means of the PTM mode and the PTP mode simultaneously, until the MBMSs received under the two modes are continuous.

The continuity judgment unit is further configured to: when the MBMSs received under the PTM mode and the PTP mode are continuous, indicate the data receiving unit to stop receiving the MBMS by means of the PTP mode.

The user equipment further comprises a signaling transmission unit, configured to: when the continuity judgment unit determines that the MBMS received under the PTM mode and the MBMS received under the PTP mode are continuous, transmit a request to the network side to request the network side to stop transmitting the MBMS by means of the PTP mode.

The present document provides the basic procedures for switching from the PTP mode to the PTM mode, and ensures the continuity of the MBMSs which are received by the UE during the switching process, and is easy to implement and operate.

PREFERRED EMBODIMENTS OF THE INVENTION

The present document provides a switchover method for multimedia broadcast multicast service (MBMS) transmission modes, including:

a network side notifying a user equipment that one or more MBMSs will be transmitted by means of a point to multipoint (PTM) mode, and transmitting relevant information of the one or more MBMSs to the user equipment; and the user equipment receiving the MBMS by means of the PTM mode according to the relevant information.

Wherein, before the network side notifies the user equipment that one or more MBMSs will be transmitted by means of the PTM mode, the network side needs to determine that a PTM mode bearer of the MBMS is established successfully, or the network side determines that the PTM mode bearer of the MBMS can be established successfully.

Wherein, the network side determines that the PTM mode bearer of the MBMS can be established successfully by the following way:

the network side determines that sufficient resources can be distributed for the MBMS transmitted by means of the PTM mode, and/or, determining that a priority rank of the MBMS is high enough.

Wherein, the user equipment notified by the network side is a user equipment which is receiving the one or more MBMSs by means of a point to point (PTP) mode.

Wherein, the network side carries the relevant information while notifying the user equipment.

Wherein, the relevant information comprises one kind or a combination of the following information: multimedia broadcast multicast service single frequency network (MBSFN) area information of the MBMS under the PTM mode, start time information of the MBMS under the PTM mode, and a temporary mobile group identify (TMGI) corresponding to the MBMS under the PTM mode.

Wherein, before receiving the MBMS by means of the PTM mode according to the relevant information, the user equipment further judges whether the user equipment has MBMS ability; if it has the MBMS ability, then receives the MBMS by means of the PTM mode according to the relevant information.

Wherein, when receiving the MBMS by means of the PTM mode, the user equipment judges whether the MBMS received under the PTM mode and the MBMS received under the PTP mode are continuous; if not, then the user equipment keeps to receive the MBMS by means of the PTM mode and the PTP mode simultaneously, until the MBMSs received under the two modes are continuous.

Wherein, when the MBMSs received by the user equipment under the PTM mode and the PTP mode are continuous, the user equipment stops receiving the MBMS by means of the PTP mode.

Wherein, when the MBMS received under the PTM mode and the MBMS received under the PTP mode by the user equipment are continuous, a request is transmitted to the network side, to request the network side to stop transmitting the MBMS by means of the PTP mode.

Wherein, only when the network side is triggered to perform the PTM mode transmission of the one or more MBMSs, the network side notifies the user equipment that the one or more MBMSs will be transmitted by means of the PTM mode.

Wherein, the network side count ups the number of the user equipment receiving the one or more MBMSs by means of the PTP mode and/or the number of the user equipment interested in receiving the one or more MBMSs by means of the PTM mode, and judges whether to trigger to perform the PTM mode transmission of the one or more MBMSs according to a counting result.

Wherein, the network side is an Evolved Universal Terrestrial Radio Access Network (E-UTRAN), and also can be other systems.

Figure 1:
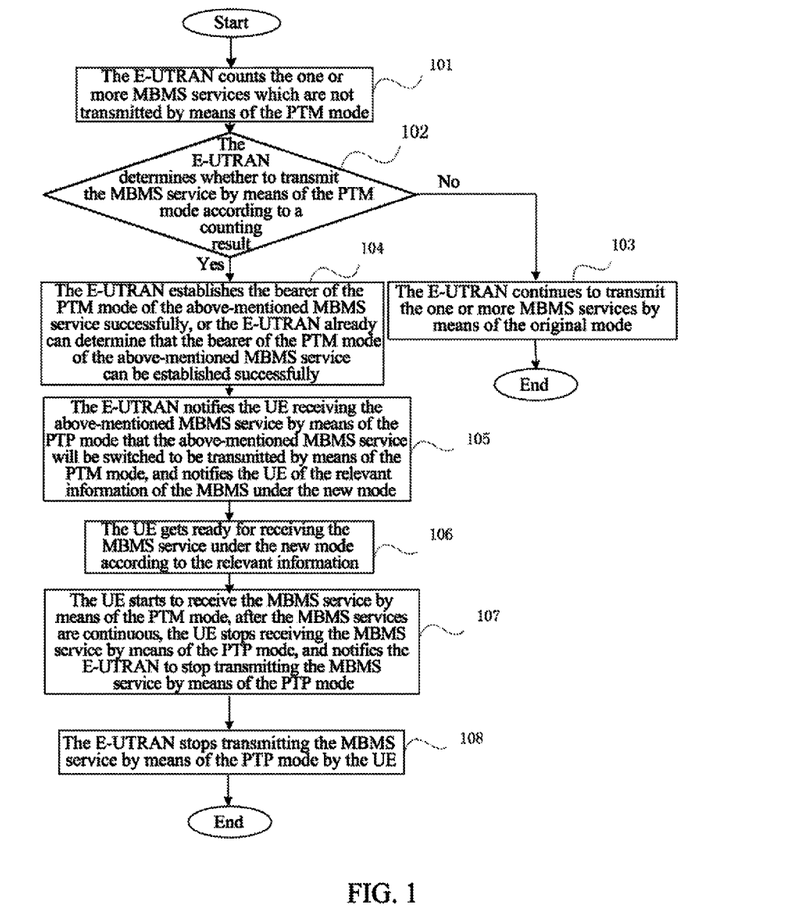
FIG. 1 is a flow chart of a switchover method for MBMS service transmission modes according to embodiment 1 and 2 of the present document.
Figure 2:
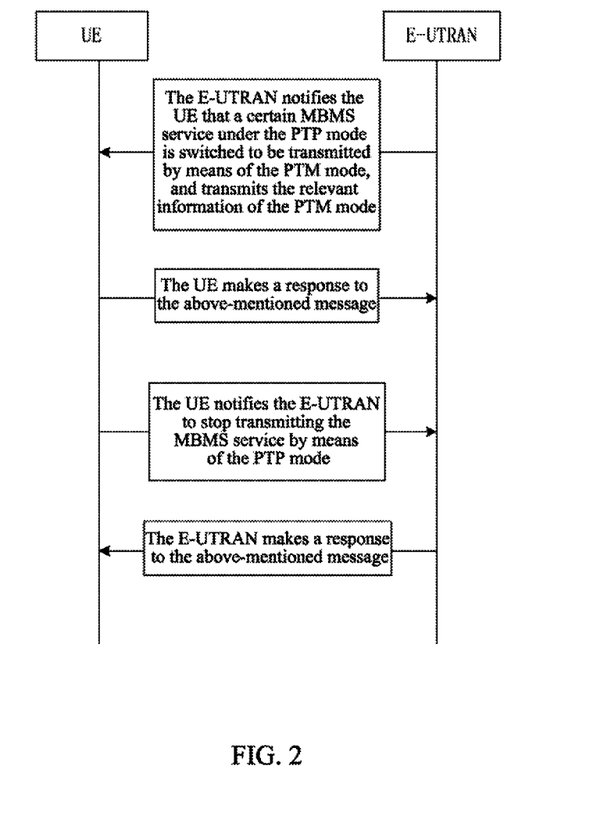
FIG. 2 is a diagram of an interaction between E-UTRAN and UE in a switchover method for MBMS service transmission modes of the present document.

As shown in FIGS. 1 and 2, the switchover method for the MBMS service transmission modes provided by the present document includes the following steps:

in step 101, the E-UTRAN counts the MBMS services transmitted by means of the PTP mode, to know whether it needs to adopt the PTM mode to transmit the MBMS service.

Because the spectrum efficiency levels of the two kinds of transmission modes are different in different scenes, generally, when the number of certain MBMS services received by means of the PTP mode in a certain area is relatively great, and when it exceeds a certain threshold (in general condition, when more than one UE receives the MBMS by means of the PTP mode in every cell in the MBSFN area averagely, it needs to adopt the PTM mode, and at this moment the PTM mode is taken regarding the MBSFN area as a unit; or when more than one UE receives the MBMS by means of the PTM mode in one cell, then it needs to adopt the PTM mode to transmit in that cell), then it should be to switch to the PTM mode for transmission, which will promote the spectrum efficiency. The UE with the MBMS ability in this text refers to the UE which can receive the Physical Multicast Channel (PMCH).

It needs to know the UE receiving situation of one or more MBMS service transmitted by means of the PTP mode, the mode adopted by the present document here is the existing counting process. The E-UTRAN can know the receiving situation of the one or more MBMS services on the UE side through the counting process, that is, for a MBMS service that is being transmitted, how many UEs (the general idea) are receiving is known, and also it can be known that how many UEs will be waiting for receiving aiming at a MBMS service to be transmitted soon. Certainly those processes are supporting processes of the present document, and the receiving situation of the one or more MBMS services on the UE side through other modes can also be known; for example, because the PTP mode is required to be performed by the UE in a RRC_Connected (connection) state, the E-UTRAN can check the identification of the service content of the UE for the UE in every connection state; if the identification is an MBMS relevant identification, then it is believed that the UE receives the MBMS service, and in this way the E-UTRAN also can know the receiving situation of the MBMS service under the PTP mode.

In step 102, the E-UTRAN determines whether to change the transmission mode of the MBMS service according to the above obtained receiving situation of the MBMS service at the UE side.

Generally, a threshold of the number of the UEs will be preset, and when the number of the UEs receiving that MBMS service reaches or exceeds that threshold, then it is to switch from the PTP transmission mode to the PTM transmission mode; vice versa. The threshold can be obtained by simulation, and also other judgment modes can be used.

The switchover of the transmission mode also can be performed according to other requirements, for example, in some cases, the operator wants to switch the transmission mode of the MBMS service, now the command of selecting and performing the switchover can be output in that step directly without the above-mentioned counting process, thus the switchover of the transmission mode is performed.

The E-UTRAN network element which performs the judgment specifically can be one or more of a Multi-cell/multicast Coordination Entity (MCE), a Broadcast-Multicast—Service Centre (BMSC), an MBMS GateWay (MBMS GW), an evolved Node B (eNB), and a Mobility Management Entity (MME); if more than one, then further the interaction of the judgment information needs to be performed among these multiple network elements.

In step 103, if the E-UTRAN determines not to perform the switchover of the transmission mode, then the E-UTRAN suspends the subsequent procedures.

In step 104, when the E-UTRAN determines to perform the switchover of the transmission mode, the E-UTRAN establishes a connection for the new transmission mode, for example, establishing the transmission bearer of the PTM mode, including establishing the bearer on the core network side and establishing the bearer on the wireless network side. The E-UTRAN needs to determine an MBSFN area for the MBMS service, which also can be in the original MBSFN area, then it can be performed according to the procedure of transmitting a new service in the MBSFN area in the related art (specifically referring to the relevant protocols, 36.300, 36.331 and 36.443). After the E-UTRAN successfully establishes the bearer according to the new transmission mode or the E-UTRAN already can predetermine that the new transmission mode can be established successfully, (for example, the resources for transmitting the service is sufficient and/or the priority level for transmitting the service is high enough), then the E-UTRAN performs the subsequent procedures.

When the E-UTRAN establishes the connection for the new transmission mode, the original transmission mode keeps continuous. The E-UTRAN can determine the transmission mode of which MBMS service is switched through the Temporary Mobile Group Identity (TMGI) corresponding to the MBMS service under the PTP mode.

In step 105, the E-UTRAN notifies the relevant UE (here referring to the UE receiving the MBMS service of which the transmission mode is to be switched, by means of the PTP mode; if the UE is receiving a plurality of MBMS services by means of the PTP mode, then the UE needs to judge the transmission mode of which MBMS service that is being received is to be switched soon) that the transmission mode of the MBMS service will be changed soon, or the E-UTRAN notifies the relevant UE that a certain MBMS service will start the PTM mode (the UE judges whether it needs to switch the receiving mode according to whether it is receiving, by means of the PTP mode, the MBMS service which will be transmitted by means of the PTM mode after receiving the notification; if the MSBS service which is being received by the UE by means of the PTP mode includes the MBMS service to be transmitted by means of the PTM mode soon, then the UE needs to switch the receiving mode).

Wherein, the E-UTRAN can carry the relevant information of the new transmission mode to the UE, so that the UE can establish the new transmission connection fast. The relevant information includes one or more of the following information: the MBSFN area information under a new mode (such as the MBSFN area ID of the MBMS service in the new mode), start time information of the new mode (that is, the time at which the MBMS service starts to be transmitted in the new mode), and, the TMGI of the MBMS service under the new mode. The main function of the MBSFN area information under the new mode is to inform the UE of the MBSFN area in which the MBMS service is transmitted under the new mode. Because one cell can be covered by a plurality of MBSFN areas overlapped, the UE can learn the specific MBSFN area directly according to that parameter, thus avoiding the blind search of the UE. The main function of the start time information of the new mode is to inform the UE of the start time information of the MBMS service under the new mode, and in this way it is convenient for the UE to get ready for the work of receiving before the new mode is started according to its own actual conditions. The main function of the TMGI of the MBMS service under the new mode is to inform the UE of the TMGI in the new mode adopted by the MBMS service of which the transmission mode is switched, and in this way it is convenient for the UE to receive the MBMS service directly. If the UE is receiving a plurality of MBMS services by means of the PTP mode, then the E-UTRAN also needs to inform the UE that the transmission mode of which MBMS service(s) that is(are) being received by means of the PTP mode is to be switched soon specifically.

In step 106, after receiving the notification from the E-UTRAN, the UE establishes the receiving connection under the new mode in time according to the relevant information of the new mode transmitted by the E-UTRAN; generally speaking, the E-UTRAN needs to reserve a regular time for the UE, to guarantee that the UE can finish the preparation work of the new receiving mode in the reserved time, so as to guarantee switching in time.

In step 107, when the above-mentioned relevant information includes the start time information of the new mode, and if the start time of the new mode comes, the UE starts to receive the MBMS service under the new mode, wherein:

if the MBMS service data received under the new mode and the data received under the original PTP mode by the UE are continuous, then the UE transmits a request to the E-UTRAN for stopping the transmission under the original PTP mode;

if the MBMS service data received under the new mode and the data received under the original PTP mode by the UE are not continuous, then the UE continues keeping the original PTP mode for receiving, and receives under the new mode at the same time; until the data under the two receiving modes are continuous, the UE transmits the request to the E-UTRAN for stopping the transmission under the original PTP mode. Here, the UE is triggered to determine whether to transmit the request to the UE E-UTRAN for stopping the transmission of the MBMS service under the original mode according to whether the MBMS services received by itself under the new mode and the original mode are continuous, which can guarantee the service continuity of the UE during the switchover process of the receiving mode.

If the relevant information further includes the MBSFN area information under the new mode (that is, the MBSFN area to which the MBMS service belongs under the new mode) and the TMGI information adopted by the MBMS service under the new mode, then the UE can receive the service corresponding to the designated TMGI in the designated MBSFN area directly; if the above-mentioned two kinds of information are not included, then the UE needs to search all MBSFN areas in the present cell by itself to find the corresponding MBMS service under the original PTP mode, which expands the search process of the UE.

When the above-mentioned relevant information does not include the start time information of the new mode, while includes the MBSFN area information under the above-mentioned new mode (such as the MBSFN area ID) and the TMGI of the MBMS service under the new mode, then the UE starts to get ready for establishing the PTM mode to receive the MBMS service directly after receiving the information for notifying that the MBMS service transmitted under the PTP mode is to be changed soon, which is transmitted by the E-UTRAN; after preparation is finished, the UE receives the system information block (SIB) of the Broadcast Control Channel (BCCH) (such as SIB13), to find the MBSFN area information under the new mode in the MBSFN area information list therein (if there is not the information, then the UE waits for receiving again after the next broadcast control information is updated, until it finds that the MBSFN area information (the MBSFN area ID) is in the MBSFN area information list), and then the UE receives the Multimedia Communication Channel (MCCH) corresponding to the MBSFN area information, finds the service corresponding to the TMGI, and starts to receive the MBMS service under the new mode.

When the above-mentioned relevant information does not include the start time information of the new mode, while includes the MBSFN area information (such as the MBSFN area ID) under the above-mentioned new mode, then the UE starts to get ready for receiving the MBMS service by means of the PTM mode directly after the UE receives the information for notifying that the MBMS service transmitted under the PTP mode is to be changed soon, which is transmitted by the E-UTRAN; after preparation is finished, the UE receives the SIB of the Broadcast Control Channel (BCCH) (such as SIB13), to find the MBSFN area information under the new mode in the MBSFN area information list therein (if there is not the information, then the UE waits for receiving again after the next broadcast control information is updated, until it finds that the MBSFN area information (the MBSFN area ID) is in the MBSFN area information list), and then the UE receives the MCCH corresponding to the MBSFN area information, finds the corresponding TMGI when the UE adopts the PTP mode to receive the MBMS service therefrom; if the TMGI is found, then it is received. However, in that mode, the E-UTRAN is required to guarantee that the TMGI of the MBMS service does not change when the PTP mode is switched to the PTM mode.

When the above-mentioned relevant information does not include the start time information of the new mode, while includes the TMGI of the MBSFN service under the above-mentioned new mode, then the UE starts to get ready for receiving the MBMS service by means of the PTM mode directly after the UE receives the information for notifying that the MBMS service transmitted under the PTP mode is to be switched to transmit under the PTM mode soon, which is transmitted by the E-UTRAN; after preparation is finished, the UE receives the system information block (SIB) of the Broadcast Control Channel (BCCH) (such as SIB13), determines all MBSFN area information in the cell, and receives the MCCH of every MBSFN one by one until the above-mentioned TMGI is found therefrom, and then receives the MBMS service corresponding to the TMGI. So it can be found that the MBSFN area information under the above-mentioned new mode is covered by a plurality of MBSFN areas overlapped in the cell, which can greatly shorten the process that the UE searches for the MBMS service under the new mode.

In step 108, the E-UTRAN responds to the request of the UE after receiving the request, and stops transmitting the MBMS by means of the original PTP mode for the UE.

Embodiment 1, supposing that part of cells in a certain MBSFN area formed by some cells are providing a certain MBMS service to some UEs by means of the PTP mode, the MBMS service is not transmitted in the MBSFN area by means of the PTM mode, but the MBMS service will start to be transmitted by means of the PTM mode soon, and now the E-UTRAN performs the counting process for the MBMS service to count up the number of the UEs receiving the MBMS service by means of the PTP mode, and the number of the UEs interested in receiving the MBMS service after transmitting the MBMS service by means of the PTM mode; supposing that the E-UTRAN knows that the number of UEs receiving under the PTP mode and number of UEs interested in receiving are relatively great after counting and exceed the preserved threshold, then the E-UTRAN will adopt the PTM mode in the MBSFN area for the MBMS service in order to obtain a higher spectrum efficiency, so it prepares to switch the transmission mode of the MBMS service. It is understood with reference to FIG. 1.

The E-UTRAN knows that it is required to switch to the PTM mode to transmit, for the MBMS service which is transmitted under the above-mentioned PTP mode. Then the E-UTRAN performs the bearer establishment preparation of the control plane in the PTM mode, that is, configures the resources for transmitting the MBMS service under the PTM mode, the MBMS service scheduling priority; and determines the time of scheduling for transmission, etc. If the E-UTRAN is ready, then the E-UTRAN transmits the relevant information to the UE receiving the MBMS service under the PTP mode, and the relevant information is mainly for informing these UEs that the original PTP transmitting/receiving mode of the MBMS service will be switched to the PTM mode for transmission, and informing the UE of some parameter information of adopting the new PTM transmitting/receiving mode; and this parameter information can help the UE to establish the PTM receiving mode fast. The relevant information includes the MBSFN area information under the new mode (that is, the MBSFN area ID of MBMS service in the new mode), the start time information in the new mode (that is, the time for starting to transmit the MBMS service under the new mode), and the TMGI of the MBMS service in the new mode. Alternatively, the UE respond to the E-UTRAN with information for confirming the reception after receiving the relevant information transmitted by the E-UTRAN.

The UE performs receiving establishing under the new PTM mode according to the relevant information received from the E-UTRAN. Specifically, the UE gets ready for receiving in the cell according to the MBSFN area information and the TMGI information under the new mode before the starting time of the new mode; after the starting time of the new mode is reached, the UE starts to receive the MBMS service corresponding to the TMGI of the MBSFN area. After the UE starts to receive the MBMS service by means of the PTM mode, it needs to judge whether the MBMS service received by means of the PTM mode and the MBMS service received by means of the PTP mode are already continuous. Because the different UEs, which receive the same MBMS service by means of the original PTP mode, receive the contents of the MBMS service asynchronously, but the time difference is not so great on the whole (for example at the order of second). If discontinuous, the UE keeps receiving the MBMS by means of the PTM mode and the PTP mode simultaneously, until the MBMS received under the two modes are continuous.

When the contents of the MBMS service before and after the transmission mode of UE is switched are already continuous, then the UE transmits the request to the E-UTRAN to request the E-UTRAN to stops continuously transmitting the MBMS service by means of the PTP mode for the UE. After the E-UTRAN receives the request transmitted by the UE, it transmits confirmation information to the UE optionally, and then stops continuously transmitting the MBMS service in the PTP mode for the UE, and the E-UTRAN releases the corresponding resources. The UE does not continue receiving the MBMS service by means of the PTP mode.

Embodiment 2, supposing that part of cells in a certain MBSFN area formed by some cells are providing a certain MBMS service to some UEs by means of the PTP mode, the MBMS service is not transmitted in the MBSFN area by means of the PTM mode; now the operator performs statistics on the MBMS service, and here the counting mechanism is not used any more but other mechanisms are used. For example, the UE is required to be in the connection state when receiving the MBMS service by means of the PTP mode, and now the E-UTRAN can know the MBMS service which is received by the UEs; with this kind of statistics mode, only statistics is only performed on the UE receiving the MBMS service by means of the PTP mode, excluding the UE interested in receiving the MBMS service in the embodiment 1. Supposing that the E-UTRAN knows that the number of UEs receiving under the PTP mode is relatively great after performing the statistics, and supposing that the number of UESs exceeds the preset threshold, then the E-UTRAN will adopt the PTM mode in the MBSFN area for the MBMS service in order to obtain a higher spectrum efficiency, so it is to prepare to switch the transmission mode of the MBMS service. It is understood with reference to FIG. 1.

The E-UTRAN knows that it is required to switch to the PTM mode to transmit, for the MBMS service which is transmitted under the above-mentioned PTP mode. Then the E-UTRAN performs the bearer establishment preparation of the control plane of the PTM mode, that is, configures the resources for transmitting the MBMS service under the PTM mode, the MBMS service scheduling priority; and determines the time of scheduling for transmission, etc. If the E-UTRAN already can determine that the above-mentioned conditions can be fully realized, for example, the resources are sufficient, the scheduling priority level is the highest, etc., and all of those can be used to determine that the preparation is completed, then the E-UTRAN transmits the relevant information to the UE receiving the MBMS service under the PTP mode, and the relevant information is mainly for informing these UEs that the original PTP transmitting/receiving mode of the MBMS service will be changed into the PTM mode for transmission, and informing the UE of some parameter information of adopting the new PTM transmitting/receiving mode; and the parameter information can help the UE to establish the PTM receiving mode fast. The relevant information includes the MBSFN area information under the new mode (that is, the MBSFN area ID of MBMS service under the new mode), and the TMGI of the MBMS service under the new mode. Alternatively, the UE responds to the E-UTRAN with information for confirming the reception after receiving the relevant information transmitted by the E-UTRAN.

The UE performs receiving establishing under the new PTM mode according to the relevant information received from the E-UTRAN. Specifically, because there is not the starting time information of the PTM in the new mode, the UE starts to prepare for receiving in the cell according to the MBSFN area information and the TMGI information under the new mode immediately, and tries to find the TMGI in the MCCH of the MBSFN area; and after the TMGI is found, the UE starts to receive the MBMS service corresponding to the TMGI.

After the UE starts to receive the MBMS service by means of the PTM mode, it needs to judge whether the MBMS service received under the PTM mode and the MBMS service received under the PTP mode are already continuous. Because the different UEs, which receive the same MBMS service by means of the original PTP mode, receive the contents of the MBMS service asynchronously, but the time difference is not so great on the whole (for example at the order of second). When the contents of the MBMS service before and after the UE switches the transmission mode are already continuous, then the UE transmits the request to the E-UTRAN to request the E-UTRAN to stops continuously transmitting the MBMS service under the PTP mode for the UE. After the E-UTRAN receives the request transmitted by the UE, it transmits confirmation information to the UE alternatively, and then stops continuously transmitting the MBMS service under the PTP mode for the UE, and the E-UTRAN releases the corresponding resources. The UE does not continue receiving the MBMS service under the PTP mode.

Figure 3:
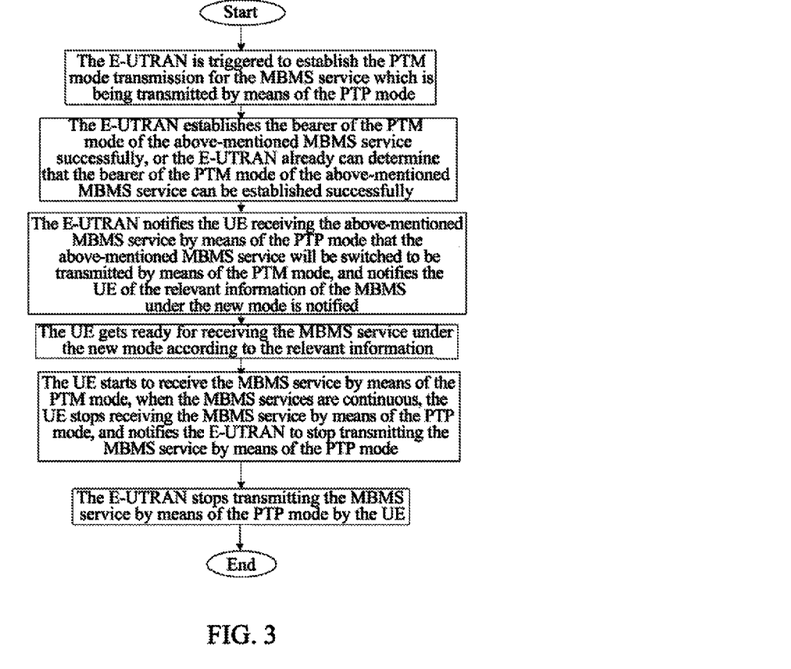
FIG. 3 is a flow chart of a switchover method for MBMS service transmission modes according to embodiment 3 of the present document.

Embodiment 3,

As shown in FIG. 3, supposing that part of cells in a certain MBSFN area formed by some cells are providing a certain MBMS service to some UEs by means of the PTP mode, the MBMS service does not transmit in the MBSFN area by means of the PTM mode; now the operator considers that the resources in the MBSFN area are not very sufficient, then determines to transmit the MBMS service under the PTM mode; alternatively, the operator needs to adopt the PTM mode to transmit in the whole MBSFN area in order to achieve some operation purposes. Then the operator triggers the E-UTRAN to start establishing the bearer of the PTM transmission for the MBMS service tentatively. The procedures are referred to FIG. 3. Because the E-UTRAN needs to get ready for establishing the PTM mode bearer, because some limitations perhaps may not be successful, the E-UTRAN attempts to establish the PTM mode; and it is supposed that the attempt is successful hereinafter.

The E-UTRAN knows that it is required to switch to the PTM mode to transmit, for the MBMS service which is transmitted under the above-mentioned PTP mode. Then the E-UTRAN performs the bearer establishment preparation of the control plane in the PTM mode, that is, configures the resources for transmitting the MBMS service under the PTM mode, the MBMS service scheduling priority; and determines the time of scheduling for transmission, etc. If the E-UTRAN is ready, then the E-UTRAN transmits the relevant information to the UE receiving the MBMS service under the PTP mode, and the relevant information is mainly for informing these UEs that the original PTP transmission mode of the MBMS service will be switched to the PTM mode for transmission, and informing the UE of some parameter information of adopting the new PTM transmitting/receiving mode; and this parameter information can help the UE to establish the PTM receiving mode fast. The relevant information includes the TMGI of the MBMS service under the new mode. Alternatively, the UE respond to the E-UTRAN with information for confirming the reception after receiving the relevant information transmitted by the E-UTRAN.

The UE performs receiving establishing under new PTM mode according to the relevant information received from the E-UTRAN. Specifically, because there is not the starting time information of the PTM in the new mode, the UE starts to prepare for receiving according to the relevant information immediately; because there is no MBSFN area information under the new mode, the UE needs to receive all MBSFN areas in the cell, and searches for the TMGI information under the new mode from the MCCH corresponding to every MBSFN area one by one, and until the TMGI is found, the UE starts to receive the MBMS service corresponding to the TMGI.

After the UE starts to receive the MBMS service by means of the PTM mode, it needs to judge whether the MBMS service received under the PTM mode and the MBMS service received under the PTP mode are already continuous. Because the different UEs, which receive the same MBMS service by means of the original PTP mode, receive the contents of the MBMS service asynchronously, but the time difference is not so great on the whole (for example at the order of second). When the contents of the MBMS service before and after the UE switches the transmission mode are already continuous, then the UE transmits the request to the E-UTRAN to request the E-UTRAN to stops continuously transmitting the MBMS service under the PTP mode for the UE. After the E-UTRAN receives the request transmitted by the UE, it transmits confirmation information to the UE alternatively, and then stops continuously transmitting the MBMS service under the PTP mode for the UE, and the E-UTRAN releases the corresponding resources. The UE does not continue receiving the MBMS service under the PTP mode.

Figure 4:
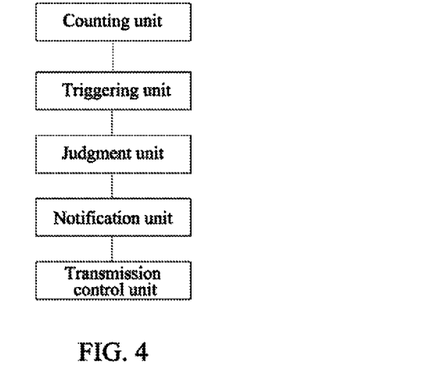
FIG. 4 is a block diagram of a switchover apparatus for multimedia broadcast multicast service transmission modes of the present document.

The present document further provides a switchover apparatus for multimedia broadcast multicast service (MBMS) transmission modes, as shown in FIG. 4, including:

a notification unit, configured to notify a user equipment that one or more MBMSs will be transmitted by means of a point to multipoint (PTM) mode, and transmit relevant information of the one or more MBMSs to the user equipment.

Wherein, the apparatus further includes a judgment unit, wherein, the judgment unit is configured to judge whether a PTM mode bearer of the MBMS is established successfully, or judge whether the PTM mode bearer of the MBMS can be established successfully; if yes, then indicate the notification unit to notify the user equipment that the one or more MBMSs will be transmitted by means of the PTM mode.

Wherein, the judgment unit is configured to determine that the PTM mode bearer of the MBMS can be established successfully by the following way:

the judgment unit determines that sufficient resources can be distributed for the MBMS transmitted by means of the PTM mode, and/or, a priority rank of the MBMS is high enough.

Wherein, the notification unit is configured to notify the user equipment which is receiving the one or more MBMSs by means of a point to point (PTP) mode.

Wherein, the notification unit is configured to carry the relevant information while notifying the user equipment.

Wherein, the relevant information includes one kind or a combination of the following information: multimedia broadcast multicast service single frequency network (MBSFN) area information of the MBMS under the PTM mode, start time information of the MBMS under the PTM mode, and a temporary mobile group identify (TMGI) corresponding to the MBMS under the PTM mode.

Wherein, the apparatus further includes a transmission control unit, wherein, the transmission control unit is configured to control the network side to stop transmitting the MBMS for the user equipment by means of the PTP mode when receiving a request from the user equipment to request to stop transmitting the MBMS by means of the PTP mode.

Wherein, the apparatus further includes a triggering unit, wherein, the triggering unit is configured to trigger to perform the PTM mode transmission of the one or more MBMSs; and the notification unit is configured to notify the user equipment that the one or more MBMSs will be transmitted by means of the PTM mode only after the triggering unit triggers to perform the PTM mode transmission of the one or more MBMSs.

Wherein, the apparatus further includes a counting unit, configured to count up the number of the user equipments receiving the one or more MBMSs by means of the PTP mode and/or the number of the user equipments interested in receiving the one or more MBMSs by means of the PTM mode; and the triggering unit is configured to judge whether to trigger to perform the PTM mode transmission of the one or more MBMSs according to the counting result of the counting unit.

Figure 5:
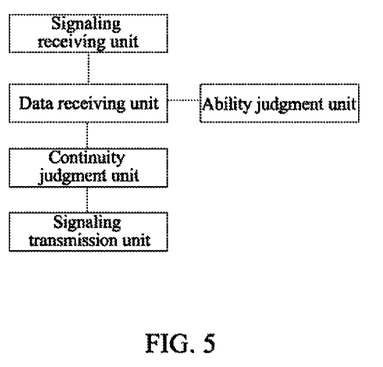
FIG. 5 is a block diagram of a user equipment of the present document.

The present document further provides a user equipment, as shown in FIG. 5, wherein, the user equipment includes:

a signaling receiving unit, configured to receive a notification that one or more multimedia broadcast multicast services (MBMS) will be transmitted by means of a point to multipoint (PTM) mode from a network side, and receive relevant information of the one or more MBMSs; and a data receiving unit, configured to receive the one or more MBMSs by means of the PTM mode according to the relevant information.

Wherein, the user equipment further includes an ability judgment unit, wherein, the is ability judgment unit configured to: before the data receiving unit receives the MBMS by means of the PTM mode according to the relevant information, judge whether the user equipment has MBMS ability; if the user equipment has the MBMS ability, then indicate the data receiving unit to receive the MBMS.

Wherein, the user equipment further includes a continuity judgment unit, configured to: when the data receiving unit receives the MBMS by means of the PTM mode, judge whether the MBMS received under the PTM mode and the MBMS received under the PTP mode are continuous; if not, then indicate the data receiving unit to keep receiving the MBMS by means of the PTM mode and the PTP mode simultaneously, until the MBMSs received under the two modes are continuous.

Wherein, the continuity judgment unit is further configured to: when the MBMSs received under the PTM mode and the PTP mode are continuous, indicate the data receiving unit to stop receiving the MBMS by means of the PTP mode.

Wherein, the user equipment further includes a signaling transmission unit, configured to: when the continuity judgment unit determines that the MBMS received under the PTM mode and the MBMS received under the PTP mode are continuous, transmit a request to the network side to request the network side to stop transmitting the MBMS by means of the PTP mode.

The present document is not only suitable for the E-UTRAN system, and can also be used for other systems. In addition, the present document is not only suitable for switching from the PTP transmission mode to the PTM transmission mode, if there is another transmission mode of the MBMS service, it can also use the switchover method described in the present document.

The present document realizes the switchover from the PTP mode to the PTM mode for transmitting the MBMS, and ensures the continuity of the MBMSs which are being received by the UE during the switching process, and is easy to implement and operate.

Obviously, it can be understood by those skilled in the art that each module or each step above-mentioned in the present document can be implemented by the universal computing apparatus, and they can be integrated in a single computing apparatus, or distributed in the network made up by a plurality of computing apparatus. Alternatively, they can be implemented by the program codes executable by the computing apparatus. Accordingly, they can be stored in the storage apparatus and implemented by the computing apparatus, or they are made into each integrated circuit module respectively, or a plurality of modules or steps therein are made into the single integrated circuit module to be implemented. Thus, the present document is not limit to any specific form of the combination of the hardware and software.

INDUSTRIAL APPLICABILITY

Compared with the related art, the present document ensures the continuity of the MBMSs which are being received by the UE during the switching process from the PTP mode to the PTM mode, and is easy to implement and operate.

What we claim is:

1. A switchover method for multimedia broadcast multicast service (MBMS) transmission modes, comprising:
a network side counting up a number of user equipments (UE) which are receiving one or more MBMSs by means of a point to point (PTP) mode and/or a number of user equipments interested in receiving the one or more MBMSs by means of a point to multipoint (PTM) mode,
if the network side determines to trigger to transmit the one or more MBMSs by means of the PTM mode according to the counting result, and the network side determines that the PTM mode can be established successfully according to a priority rank of the PTM bearer of the one or more MBMSs and/or MBMS resources, then the network side notifying the user equipment that the one or more MBMSs will be transmitted by means of the PTM mode, and transmitting relevant information of the one or more MBMSs to the user equipment;
wherein the relevant information comprises one kind or a combination of the following information: multimedia broadcast multicast service single frequency network (MBSFN) area information of the MBMS under the PTM mode, start time information of the MBMS under the PTM mode, and a temporary mobile group identify (TMGI) corresponding to the MBMS under the PTM mode;
wherein when the relevant information does not comprise the start time information and the TMGI under the PTM mode, while comprises the corresponding MBSFN area information, after the UE gets ready for establishing the PTM mode, the UE receives the SIB13 of a Broadcast Control Channel (BCCH) and obtains a MBSFN area information list in the SIB13 till the MBSFN area information is found from the list, the UE receives the MCCH corresponding to the MBSFN area information and obtains the TMGI of the MBMS under the PTM mode according to the TMGI of the MBMS under the PTP mode from the MCCH, and starts to receive the MBMS under the PTM mode.

2. The method according to claim 1, further comprising: the relevant information comprising the MBSFN area information when a cell where the UE is located is covered by a plurality of MBSFN areas overlapped.

3. The method according to claim 1, further comprising: when the MBMS received under the PTM mode and the MBMS received under the PTP mode by the user equipment are continuous, transmitting a request to the network side to request the network side to stop transmitting the MBMS by means of the PTP mode.

4. The method according to claim 1, wherein, that the network side determines to transmit the one or more MBMSs by means of the PTM mode according to a counting result comprises: if the counted number of the user equipments reaches or exceeds a preset threshold of the number of the user equipments, determining to trigger to transmit the one or more MBMSs by means of the PTM mode.

5. The method according to claim 1, wherein, the network side is an Evolved Universal Terrestrial Radio Access Network (E-UTRAN), and the network side comprises a Multi-cell/multicast Coordination Entity (MCE), a Broadcast-Multicast-Service Centre (BMSC), an MBMS GateWay, an evolved Node B, and a Mobility Management Entity (MME).

6. The method according to claim 1, wherein a network element which performs determining at the network side is an MCE.

7. The method according to claim 1, wherein, when the relevant information comprises start time information of the MBMS under the PTM mode, MBSFN area information of the MBMS under the PTM mode, and the TMGI information corresponding to the MBMS service under the PTM mode, after the UE gets ready for establishing the PTM mode, the UE receives the MBMS service corresponding to a designated TMGI in the MBSFN area directly;
when the relevant information comprises start time information of the MBMS under the PTM mode, and does not comprise MBSFN area information of the MBMS under the PTM mode and the TMGI information corresponding to the MBMS service under the PTM mode, after the UE gets ready for establishing the PTM mode, the UE searches all MBSFN areas in a current cell till a corresponding MBMS service under an original PTP mode is found.

8. The method according to claim 1, wherein, when the relevant information does not comprise start time information of the MBMS under the PTM mode, while comprises the above corresponding MBSFN area information and the TMGI, after the UE gets ready for establishing the PTM mode, the UE receives a system information block 13 (SIB13) of Broadcast Control Channel (BCCH) and obtains an MBSFN area information list in the SIB13 till the MBSFN area information is found from the list, and then the UE receives Multimedia Communication Channel (MCCH) corresponding to the MBSFN area information to obtain the TMGI, and starts to receive the MBMS under the PTM mode;
when the relevant information does not comprise start time information of the MBMS under the PTM mode, while comprises the TMGI corresponding to the MBMS under the PTM mode, after the UE gets ready for establishing the PTM mode, the UE receives the SIB13 of the Broadcast Control Channel (BCCH) and obtains the MBSFN area information list in the SIB13, and obtains MCCH configuration information of each MBSFN area, receives each MCCH one by one till the TMGI corresponding to the MBMS under the PTM mode is found, and starts to receive the MBMS under the PTM mode.

9. The method according to claim 1, wherein, when the relevant information does not comprise the TMGI corresponding to the MBMS under the PTM mode, the UE defaults that the corresponding TMGI under the PTM mode is the same as the TMGI under the PTP mode.

10. A switchover apparatus for multimedia broadcast multicast service (MBMS) transmission modes, comprising:
a processor; and
a storage device storing computer executable instructions that when executed by the processor cause the processor to perform the steps in the following units:
a counting unit, configured to count up a number of user equipments (UE) which are receiving one or more MBMSs by means of a PTP mode and/or a number of user equipments interested in receiving the one or more MBMSs by means of a PTM mode;
a triggering unit, configured to judge whether to trigger to transmit the one or more MBMSs by means of the PTM mode according to a counting result of the counting unit;
a judgment unit, configured to, when the trigger unit determines to trigger to transmit the one or more MBMSs by means of the PTM mode, judge whether a PTM mode bearer of the MBMS can be established successfully according to a priority rank of the PTM bearer of the one or more MBMSs and/or MBMS resources; if yes, indicate a notification unit to notify the user equipment that the one or more MBMSs will be transmitted by means of the PTM mode;
a notification unit, configured to notify a user equipment that one or more MBMSs will be transmitted by means of a point to multipoint (PTM) mode, and transmit relevant information of the one or more MBMSs to the user equipment; wherein, the relevant information comprises one kind or a combination of the following information: multimedia broadcast multicast service single frequency network (MBSFN) area information of the MBMS under the PTM mode, start time information of the MBMS under the PTM mode, and a temporary mobile group identify (TMGI) corresponding to the MBMS under the PTM mode;
wherein when the relevant information does not comprise the start time information and the TMGI under the PTM mode, while comprises the corresponding MBSFN area information, after the UE gets ready for establishing the PTM mode, the UE receives the SIB 13 of a Broadcast Control Channel (BCCH) and obtains a MBSFN area information list in the SIB13 till the MBSFN area information is found from the list, the UE receives the MCCH corresponding to the MBSFN area information and obtains the TMGI of the MBMS under the PTM mode according to the TMGI of the MBMS under the PTP mode from the MCCH, and starts to receive the MBMS under the PTM mode.

11. The apparatus according to claim 10, wherein, that the judgment unit determines that the PTM mode bearer of the MBMS can be established successfully comprises: determining that sufficient resources can be distributed for the MBMS transmitted by means of the PTM mode, and/or, determining that a priority rank of the MBMS is high enough;
that the triggering unit determines to trigger to transmit the one or more MBMSs by means of the PTM mode according to a counting result comprises: if the counted number of the user equipments reaches or exceeds a preset threshold of the number of the user equipments, determining to trigger to transmit the one or more MBMSs by means of the PTM mode.

12. The apparatus according to claim 10, wherein the storage device further stores computer executable instructions that when executed by the processor cause the processor to perform the steps in the following unit: a transmission control unit, configured to control a network side to stop transmitting the MBMS for the user equipment by means of the PTP mode when receiving a request from the user equipment to request to stop transmitting the MBMS by means of the PTP mode.

13. The apparatus according to claim 10, wherein, the notification unit transmits the relevant information of the one or more MBMSs to the user equipment, and wherein the relevant information comprises the MBSFN area information when a cell where the UE is located is covered by a plurality of MBSFN areas overlapped.

14. A user equipment, comprising:
a processor;
a storage device storing computer executable instructions;
a signaling receiving unit, configured to receive a notification that one or more multimedia broadcast multicast services (MBMS) will be transmitted by means of a point to multipoint (PTM) mode from a network side, and receive relevant information of the one or more MBMSs; wherein, the relevant information comprises one kind or a combination of the following information: multimedia broadcast multicast service single frequency network (MBSFN) area information of the MBMS under the PTM mode, start time information of the MBMS under the PTM mode, and a temporary mobile group identify (TMGI) corresponding to the MBMS under the PTM mode; and
a data receiving unit, configured to receive the one or more MBMSs by means of the PTM mode according to the relevant information;
wherein when the relevant information received by the signaling receiving unit does not comprise the start time information and the TMGI under the PTM mode, while comprises the corresponding MBSFN area information, after the data receiving unit gets ready for establishing the PTM mode, the data receiving unit receives the SIB13 of a Broadcast Control Channel (BCCH) and obtains a MBSFN area information list in the SIB13 till the MBSFN area information is found from the list, and the UE receives the MCCH corresponding to the MBSFN area information and obtains the TMGI of the MBMS under the PTM mode according to the TMGI of the MBMS under the PTP mode from the MCCH, and starts to receive the MBMS under the PTM mode.

15. The user equipment according to claim 14, wherein the storage device stores computer executable instructions that when executed by the processor cause the processor to perform the steps in the following unit: an ability judgment unit, configured to: before the data receiving unit receives the MBMS by means of the PTM mode according to the relevant information, judge whether the user equipment has MBMS ability; if the user equipment has the MBMS ability, then indicate the data receiving unit to receive the MBMS.

16. The user equipment according to claim 14, wherein the storage device stores computer executable instructions that when executed by the processor cause the processor to perform the steps in the following unit: a continuity judgment unit, configured to: when the data receiving unit receives the MBMS by means of the PTM mode, judge whether the MBMS received under the PTM mode and the MBMS received under the PTP mode are continuous; if not, then indicate the data receiving unit to keep receiving the MBMS by means of the PTM mode and the PTP mode simultaneously until the MBMSs received under the two modes are continuous, then indicate the data receiving unit to stop receiving the MBMS by means of the PTP mode.

17. The user equipment according to claim 16, wherein the storage device stores computer executable instructions that when executed by the processor cause the processor to perform the steps in the following unit: a signaling transmission unit, configured to: when the continuity judgment unit determines that the MBMS received under the PTM mode and the MBMS received under the PTP mode are continuous, transmit a request to the network side to request the network side to stop transmitting the MBMS by means of the PTP mode.

18. The user equipment according to claim 14, wherein, when the relevant information received by the signaling receiving unit comprises start time information of the MBMS under the PTM mode, MBSFN area information of the MBMS under the PTM mode, and the TMGI information corresponding to the MBMS service under the PTM mode, after the data receiving unit gets ready for establishing the PTM mode, the data receiving unit receives the MBMS service corresponding to a designated TMGI in the MBSFN area directly;

when the relevant information comprises start time information of the MBMS under the PTM mode, and does not comprise MBSFN area information of the MBMS under the PTM mode and the TMGI information corresponding to the MBMS service under the PTM mode, after the data receiving unit gets ready for establishing the PTM mode, the data receiving unit searches all MBSFN areas in a current cell till a corresponding MBMS service under an original PTP mode is found, wherein it is defaulted that the corresponding TMGI under the PTM mode is the same as the TMGI under the PTP mode.

19. The user equipment according to claim 14, wherein, when the relevant information received by the signaling receiving unit does not comprise start time information of the MBMS under the PTM mode, while comprises the above corresponding MBSFN area information and the TMGI, after the data receiving unit gets ready for establishing the PTM mode, the data receiving unit receives a system information block 13 (SIB13) of Broadcast Control Channel (BCCH) and obtains an MBSFN area information list in the SIB13 till the MBSFN area information is found from the list, and the UE receives Multimedia Communication Channel (MCCH) corresponding to the MBSFN area information to obtain the TMGI, and starts to receive the MBMS under the PTM mode;

when the relevant information received by the signaling receiving unit does not comprise start time information of the MBMS under the PTM mode, while comprises the TMGI corresponding to the MBMS under the PTM mode, after the data receiving unit gets ready for establishing the PTM mode, the data receiving unit receives the SIB13 of the Broadcast Control Channel (BCCH) and obtains the MBSFN area information list in the SIB13, and obtains MCCH configuration information of each MBSFN area, receives each MCCH one by one till the TMGI corresponding to the MBMS under the PTM mode is found, and starts to receive the MBMS under the PTM mode, wherein it is defaulted that the corresponding TMGI under the PTM mode is the same as the TMGI under the PTP mode.

* * * * *